United States Patent [19]

Call et al.

[11] 4,264,311
[45] Apr. 28, 1981

[54] DYNAMIC PARACHUTE FOUR-LINE RELEASE SIMULATOR

[75] Inventors: Douglas W. Call; Charlie L. Tucker, both of Point Mugu, Calif.

[73] Assignee: The United States of America as represented by the Secretary of the Navy, Washington, D.C.

[21] Appl. No.: 143,707

[22] Filed: Apr. 25, 1980

[51] Int. Cl.³ .............................................. G09B 9/00
[52] U.S. Cl. ......................................... 434/247; 272/6
[58] Field of Search ............................ 35/29 R; 272/6

[56] References Cited

U.S. PATENT DOCUMENTS

| | | | |
|---|---|---|---|
| 2,183,594 | 12/1939 | Strong | 272/6 |
| 2,357,293 | 9/1944 | Strong | 272/6 |
| 2,930,145 | 3/1960 | Green | 35/29 R |

Primary Examiner—Harland S. Skogquist
Attorney, Agent, or Firm—Richard S. Sciascia; Joseph M. St.Amand

[57] ABSTRACT

A dynamic parachute four-line release simulator device which allows aircrewmen to practice the steps necessary to assure a safe parachute descent and landing following emergency aircraft egress. The device is suspended at a desired height adjacent a raised platform, and is constructed of a cross-braced metal ring having parachute suspension lines connected thereto via bungee cords and eye bolts; a parachute riser assembly, which serves as an attachment point for aircrewmen trainees, is connected to the suspension lines via metal connector links.

9 Claims, 5 Drawing Figures

DYNAMIC PARACHUTE FOUR-LINE RELEASE SIMULATOR

BACKGROUND OF THE INVENTION

The present invention relates to training devices for parachutes and particularly to a simulator for parachutes using a four-line release system.

A four-line release modification has been incorporated into certain standard flat parachutes to give aircrewmen steering capabilities, to impart a forward velocity of 4–6 knots, to lower the parachute descent rate, and to minimize the possibility of parachute/man entanglement upon water entry.

There are no effective training aids presently available to simulate post egress (under parachute) conditions to give aircrewmen an opportunity to practice and rehearse parachute descent survival techniques in a realistic hands-on environment using a four-line release system.

The dynamic parachute four-line release simulator of this invention is operable for indoctrinating aircrew personnel on the proper use of parachute four-line release, and serves as a post egress trainer, permitting aircrew personnel to learn and practice proper procedures in preparation for parachute landing.

SUMMARY OF THE INVENTION

The present simulator device is constructed from a cross-braced metal ring suspended a suitable distance above and adjacent to a raised platform, using a support brace or other suitable support. Parachute suspension lines are attached to the metal ring, and a parachute riser assembly is connected to the suspension lines and serves as an attachment point for the parachute harness of an aircrewman trainee on the platform.

DESCRIPTION OF THE PREFERRED EMBODIMENT

Figure 1:
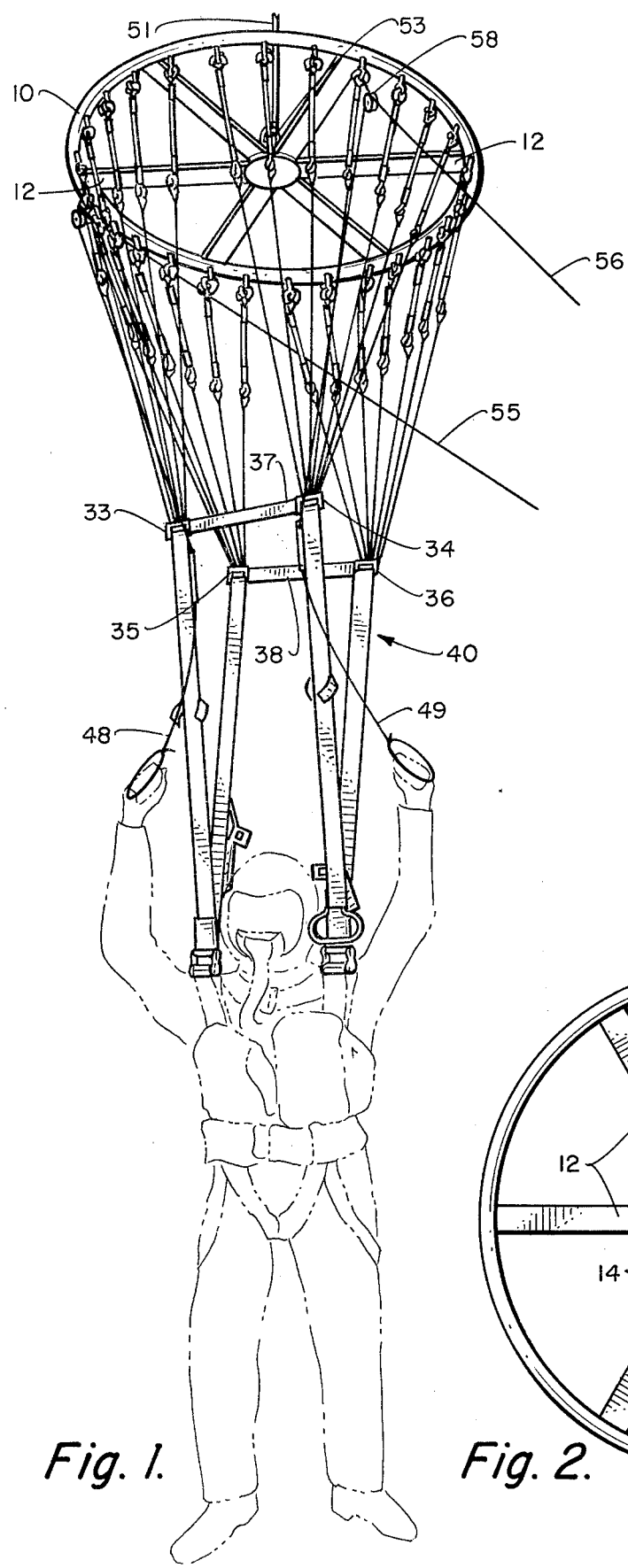
FIG. 1 shows a preferred embodiment of a simulator device of the present invention.
Figure 5:
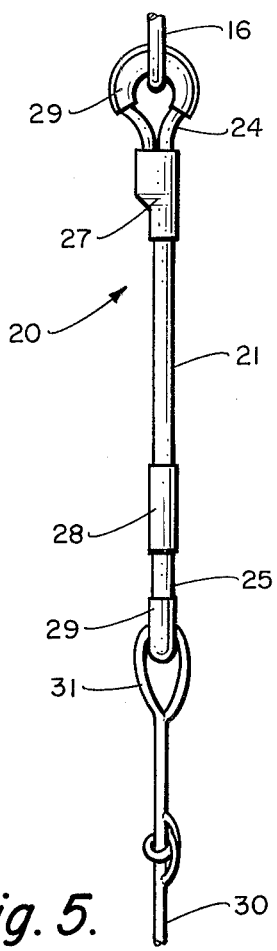
FIG. 5 shows a detailed illustration of a bungee cord used in the simulator device.
Figure 2:
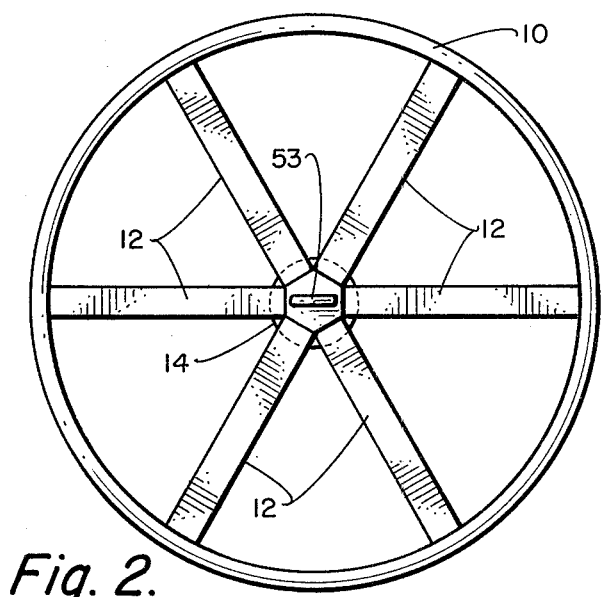
FIG. 2 is a top view of the simulator device support ring.
Figure 3:
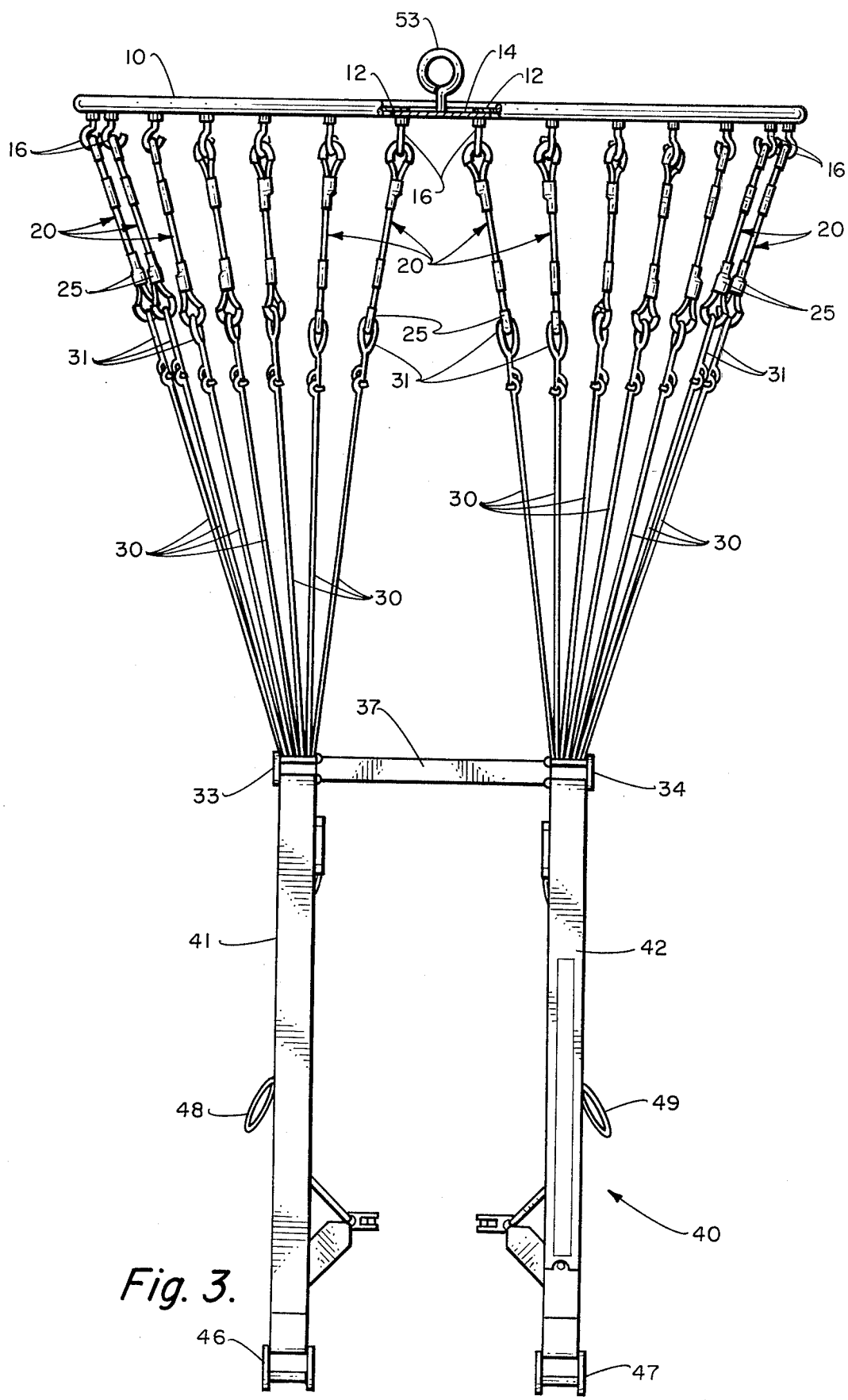
FIG. 3 is a front elevational view of the simulator device.

The dynamic parachute four-line release simulator as shown in the drawings, includes a sturdy metal ring 10, of steel for example, with a plurality of cross members 12 welded to the ring and at the center to a circular plate 14. A plurality (e.g., twenty-eight) of eye hook bolts 16 are equally spaced about the circumference of ring 10 and fastened to the underneath side by welding or other suitable means. Eye hooks 16 each support an elastic bungee cord 20 which in turn provide "under parachute canopy" simulation.

Bungee cords 20 each consist of a length of elastic cord 21 (approximately 18 inches in length) having loops 24 and 25 formed at opposite ends thereof fastened with hog rings 27 and 28, respectively. Loops 24 and 25 are protected against wear by anti-chafing pads 29 provided within each loop.

Parachute suspension lines 30 are attached to respective loops 25 at the lower end of each bungee cord 20 with a loop 31, as shown. The parachute suspension lines 30 run down to four parachute connector links 33, 34, 35 and 36. Respective suspension lines 30 (i.e., approximately seven) attached to each quadrant of the ring 10 have their lower ends attached to connector links 33, 34, 35 or 36, respectively, as shown in the drawings. Connector links 33 and 34, at the front, are joined together side by side with a parachute cross-connector strap 37, and connector links 35 and 36, at the rear, are joined together in a similar fashion with a parachute cross-connector strap 38 as shown. Connector links 33, 34, 35 and 36 also hold the nylon parachute riser assembly 40, comprising webbing 41, 42, 43 and 44. At the distal ends of riser assembly 40 are two quick-release parachute (KOCH) fittings 46 and 47.

Lanyards 48 and 49 are arranged (e.g., daisy chained) for operation to release two parachute suspension lines 30a from each of the rear riser connector links 35 and 36, respectively, when an aircrewman initially pulls down on the lanyard cord. In a normal situation using an actual parachute, by freeing these two suspension lines on each side (i.e., a total of four suspension lines), the aircrewman would be controlling his descent by allowing additional air flow from under the rear side of the parachute canopy giving him directional control (i.e., forward movement) and also reducing any oscillation.

Figure 4:
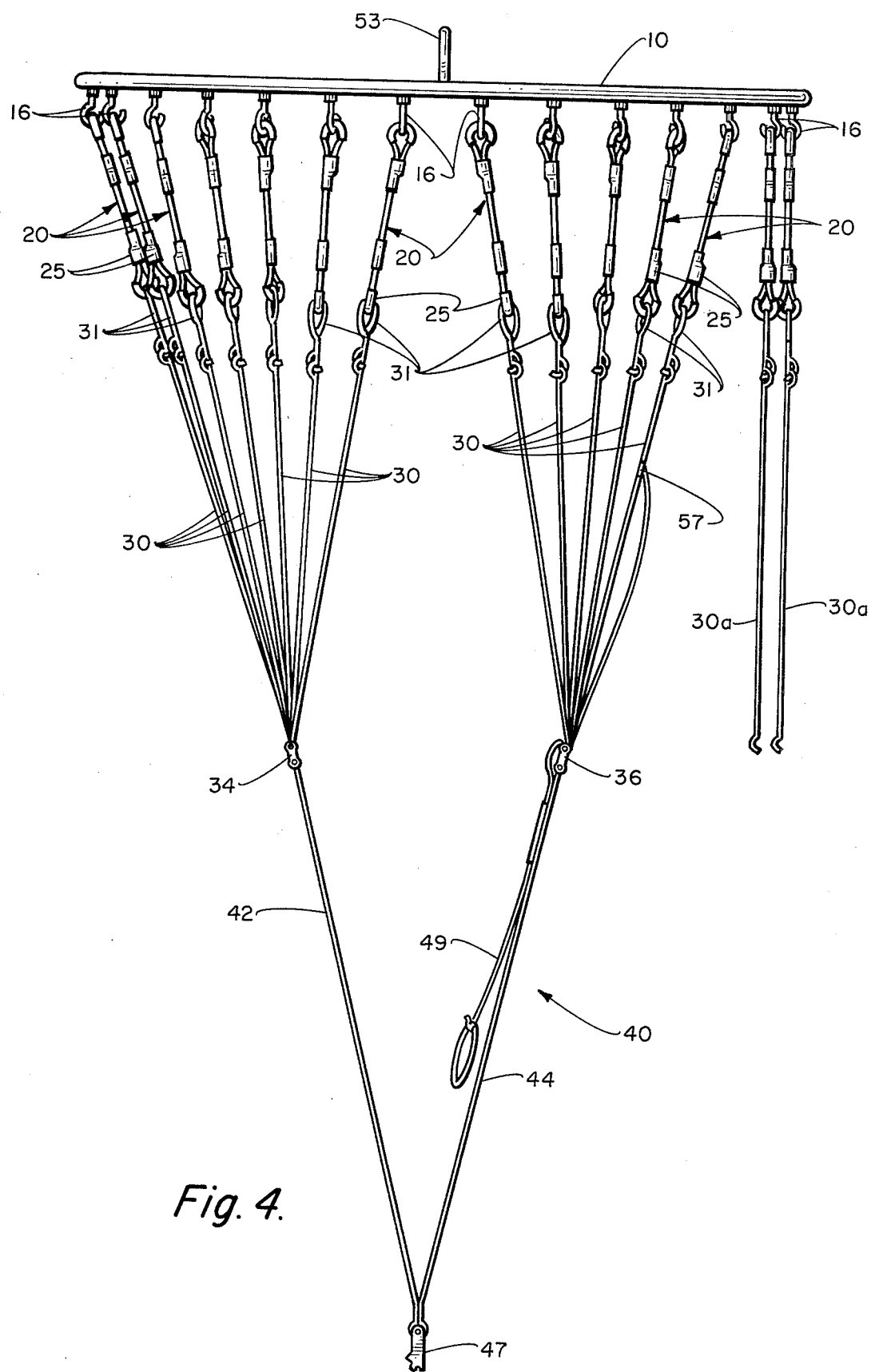
FIG. 4 is a side elevational view of an embodiment of the simulator device.

The simulator assembly is suspended from a support brace (not shown) by means of a cable 51 attached to eye bolt 53 affixed to the top of circular plate 14. Two steering lines, 55 and 56, are attached to a fixed point (not shown). The ends of lanyards 48 and 49 are normally connected to a respective unreleased line 30 at 57 as shown in FIG. 4. This provides a control, for an actual parachute in descent, to pull on either side of the parachute canopy controlling air flow direction at the rear of the canopy whereby the parachute can be directed to turn to the left or to the right. On the training simulator device, however, the top end of the lanyards 48 and 49 are connected via respective pulley means 58, on either side to respective steering lines 55 and 56 (see FIG. 1) which in turn operate to cause the ring 10, etc., to rotate to the left or to the right, depending upon the lanyard operated, thus simulating the rotation that would result with an actual parachute in descent. These features on the simulator allow aircrewmen trainees to simulate control of an actual four-line release parachute.

The dynamic simulator assembly is positioned high enough to support an aircrewman at least two feet or more above the ground while being suspended therefrom. Any suitable platform can be used to assist a trainee reach the quick release parachute fittings 46 and 47 on the dynamic simulator assembly.

When using the device, an aircrewman trainee wearing all of his personal survival equipment, steps onto a platform (not shown) and connects his parachute harness to the parachute release fittings 46 and 47 of the dynamic simulator device. The platform is then removed leaving the aircrewman, with his survival kit, suspended from the simulator device. He can then go through the post egress emergency procedures to prepare for parachute landing over water or land including operating the parachute four-line release system for controlling direction of descent, etc.

To receive a similar degree of realistic survival training, an aircrewman would be required to make an actual parachute jump, use the parachute four-line release modification and practice other procedures during descent. This, of course, would be dangerous and very costly. The disclosed simulator uses no energy to operate, requires no aircraft, and is free of any of the hazards associated with an actual parachute jump. The material to construct the simulator can be of several varieties. The ring 10, cross members 12, and plate 14, can be made from any type steel or aluminum, for example, and the eye hooks 16 can be either welded or bolted to the ring. The anti-chafing pads on the elastic bungee cords 20 can be made of leather, canvas, cotton, naugahyde, vinyl, or equivalent fabrics. Any type of elastic bungee cord which produces the springing action characteristics of the "under parachute canopy" condition is acceptable. The parachute suspension lines can be made from any suitable material. The parachute connector links, cross connector straps, riser assemblies and canopy connectors are readily available. Even overage, surveyed, parachute assemblies that are readily available and usable and can be used to construct this dynamic parachute four-line release simulator.

Obviously, many modifications and variations of the present invention are possible in the light of the above teachings. It is therefore to be understood that within the scope of the appended claims the invention may be practiced otherwise than as specifically described.

What is claimed is:

1. A dynamic parachute four-line release simulator device for providing training in parachute descent survival techniques, comprising:
   a. a support hoop having means thereon for axially suspending said hoop horizontally from a central point at a suitable distance above a ground area;
   b. a hoop supporting means for suspending the support hoop from said central point;
   c. said support hoop being operable to be moved about said central point while suspended from said hoop supporting means;
   d. a plurality of loop attachment means spaced about the circumference of said support hoop;
   e. a plurality of elastic bungee cords each having one end thereof attached to a respective one of said loop attachment means; the elasticity and number of said elastic bungee cords operating to produce springing action which contributes to providing "under parachute canopy" simulation for said simulator device;
   f. a plurality of parachute suspension lines each having one end thereof, respectively, attached to a respective opposite end of a said elastic bungee cord;
   g. said plurality of parachute lines being divided into four groups, by quadrant around said support hoop;
   h. the opposite ends of said parachute suspension lines, by quadrant group, being attached to a respective one of four parachute connector link means located two toward the front and two toward the rear of the simulator device;
   i. a parachute riser assembly having four upper ends and two distal ends; the four upper ends of said parachute riser assembly being connected to respective ones of said four parachute connector link means; the two distal ends of said parachute riser assembly each being provided with a quick-release parachute fitting operable to be connected to the parachute harness worn by a trainee;
   j. a pair of lanyards being provided on said parachute riser assembly, one on the right and one on the left, and having means at one end of each thereof for grasping by the trainee; said lanyards being operable to cause the release of a small portion of adjacent parachute suspension lines from being connected to respective left and right rear parachute connector link means thus simulating release of select suspension lines to an actual parachute canopy to provide control and forward motion in descent, and said lanyards further being operable by manipulation thereof to cause rotation of said support hoop toward the right or toward the left, respectively, thus simulating control of an actual parachute canopy whereby the parachute can be directed to turn to the right or to the left.

2. A simulator device as in claim 1 wherein said support hoop comprises a sturdy metal ring having a plurality of reinforcing cross-members and a central suspension cable attachment means.

3. A simulator device as in claim 1 wherein said elastic bungee cords, each comprise:
   a. a length of elastic cord;
   b. a loop formed at each end of said length of elastic cord and securely fastened together;
   c. anti-chafing pads provided within each of said loops for protection against wear.

4. A simulator device as in claim 1 wherein the two of said four parachute connector link means toward the front of said simulator device are joined together side by side with a first cross-connector strap, and the two of said parachute connector link means toward the rear are joined together in similar fashion with a second cross-connector strap.

5. A simulator device as in claim 1 wherein said lanyards each operate to cause the release of two adjacent pairs of parachute suspension lines in respective said groups toward the rear of the simulator training device.

6. A simulator device as in claim 1 wherein the parachute suspension lines attached to bungee cords and operable to be released from the right rear parachute connector link means by operation of said lanyard to the right are spaced about the rear edge of said support hoop immediately next to the parachute suspension lines operable to be released from the left rear parachute connector link means by operation of said lanyard to the left.

7. A simulator device as in claim 1 wherein said lanyards to the right and to the left have their opposite ends connected to means operable to cause the rotation of said support hoop toward the right and toward the left, respectively, once each said respective small portion of parachute suspension lines have been released.

8. A simulator device as in claim 7 wherein the opposite ends of said lanyards are connected to respective guy lines via pulley means for causing rotation of said support hoop toward the right and toward the left, respectively.

9. A simulator device as in claim 1 wherein approximately twenty-eight cord attachment means, elastic bungee cords and parachute suspension lines are spaced about said support hoop, approximately seven of each per quadrant.

* * * * *